March 16, 1943.   H. L. BROWN   2,313,986
PLASTIC HELICOIDAL STRUCTURE
Filed Feb. 18, 1942   2 Sheets-Sheet 1

INVENTOR.
Harold L. Brown
BY
Griswold & Burdick
ATTORNEYS

March 16, 1943.  H. L. BROWN  2,313,986
PLASTIC HELICOIDAL STRUCTURE
Filed Feb. 18, 1942  2 Sheets-Sheet 2
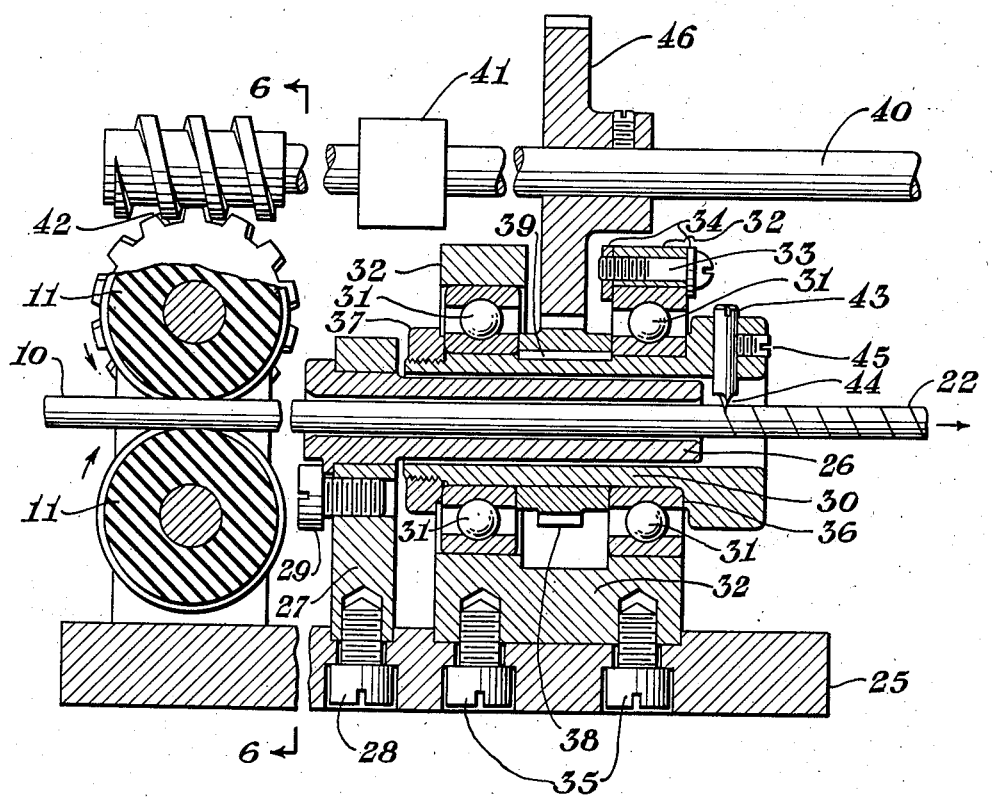
Fig.3
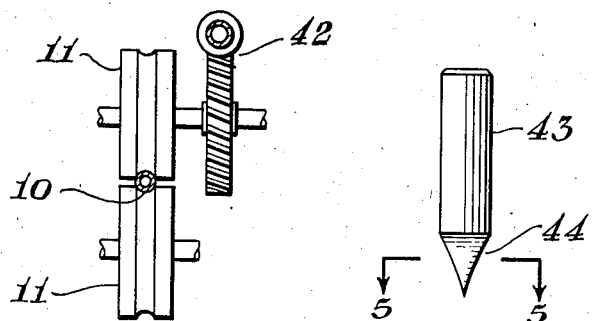
Fig.6
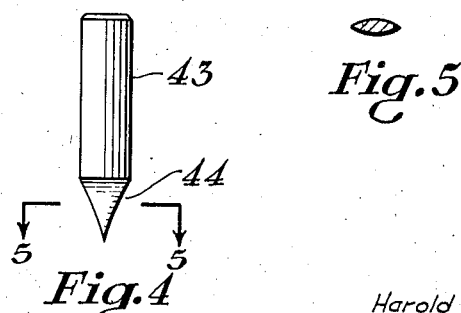
Fig.4
Fig.5
INVENTOR.
Harold L. Brown
BY
Griswold & Burdick
ATTORNEYS Patented Mar. 16, 1943

2,313,986

UNITED STATES PATENT OFFICE 2,313,986

PLASTIC HELICOIDAL STRUCTURE

Harold L. Brown, Midland, Mich., assignor to The Dow Chemical Company, Midland, Mich., a corporation of Michigan Application February 18, 1942, Serial No. 431,453

7 Claims. (Cl. 164—61)

This invention relates to methods and machinery for making plastic helicoidal structures.

Plastic helicoidal structures are used extensively as guards or wrappings for telephone cords and similar flexible assemblages to prevent knotting and kinking, as spacers in coaxial structures of various sorts, as insulators, and for decorative and other purposes. They have heretofore usually been made by winding a length of plastic material of uniform rectangular cross section evenly around a mandrel without overlapping successive coils and then heating or otherwise treating the wrapping on the mandrel to set it. The structure thus formed is then stripped from the mandrel. This and similar processes which have been suggested necessitate considerable handling of the material in process, do not permit of rapid or of continuous production of these structures and are generally expensive to operate.

It is, therefore, an object of this invention to provide a process or method whereby plastic helicoidal structures may be produced conveniently and continuously at low cost.

An additional object of the invention is to provide machinery of simple construction for continuously producing such plastic helicoidal structures.

The above and related objects are readily accomplished by continuously moving a cylindrical plastic tube, formed by extrusion or otherwise, at a substantially uniform rate along its longitudinal axis past a cutting means, such as a knife, which is set to cut or slit through one wall of the tube and which rotates around the moving tube whereby it is cut helically. The cutting operation just described may be advantageously carried out in conjunction with an extrusion operation in such manner that the extruded tube moves directly from the extruder to the rotary cutter, thus avoiding the necessity of storing the extruded tubing prior to cutting it. After passing the rotary cutter, the helically cut tube may be severed into desired lengths as by an automatically operated cut-off knife.

Reference is made to the accompanying drawings in which, in the interest of clarity, certain features are shown on a somewhat exaggerated scale:

Figure 3 is a side sectional elevation of the feed rolls and rotary cutter shown diagrammatically in Figure 2.

Figure 4 is a front elevation of the rotary knife illustrated in side sectional elevation of Figure 3.

Figure 5 is a lateral cross section taken along the line 5—5 of Figure 4.

Figure 6 is a sectional elevation on a reduced scale taken on the line 6—6 of Figure 3.

Figure 1:
Figure 1 is a plan view illustrating a helicoidal structure which the method and apparatus herein described are adapted to produce.

The helicoidal structure Figure 1 produced by the method and machinery of the present invention is characterized by several advantageous features when compared with similar structures produced in the conventional manner. These features include uniformity of coil diameter and width, even spacing of the coils, and lack of distortion of the individual coils such as may result from stretching, partial fusion of the thermoplastic material, etc., during conventional winding and heating operations.

Figure 2:
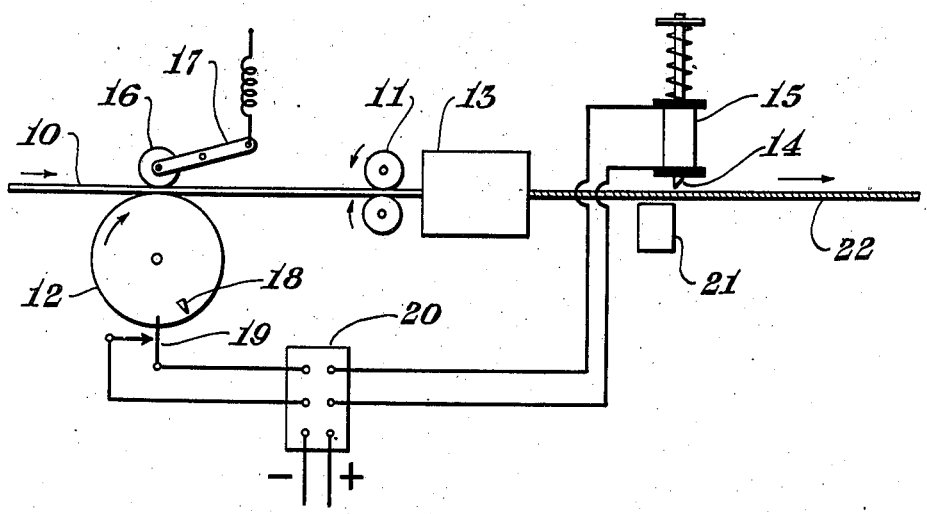
Figure 2 is a diagrammatic side elevation illustrating apparatus in which the sequence of operations is performed in the continuous manufacture of plastic helicoidal structures by the method of the present invention.

Referring further to Figure 2 of the drawings, a plastic tube 10, which may be prepared in any convenient manner, preferably by extrusion, is drawn by driven feed rolls 11 over a measuring wheel 12 and fed through a rotary cutter 13 where it is helically slit. The helically cut tube 22 issuing from the rotary cutter passes under a cut-off knife 14 which is operated by a solenoid 15 actuated by the measuring wheel 12.

As the tube passes over the measuring wheel 12, it is held in firm contact therewith by a spring tensioned hold-down wheel 16, carried at one end of a centrally pivoted spring loaded lever arm 17, and thus rotates the measuring wheel 12. The measuring wheel 12 carries near its periphery a projecting pin 18, which, as the wheel rotates, momentarily closes a spring switch 19 in an electrical circuit which serves through a relay 20 to actuate the solenoid 15, thus moving the cut-off knife 14 past the shear block 21. The helically cut tube 22 is thus cut into sections which are equal in length to the circumference of the measuring wheel 12. It is obvious that measuring wheels of different radii may be used and thus the helically cut tubing may be cut into any desired lengths. Alternatively, a plurality of projecting pins may be inserted near the periphery of the measuring wheel 12 so that each in turn closes the switch 19, and thus two or more sections of the helically cut tubing may be cut-off for each revolution of the measuring wheel. When it is desired to have all of these pieces of equal length, the projecting pins must, of course, be spaced at equal distances around the periphery of the measuring wheel. It is also obvious that other means of actuating the solenoid 15 may be substituted for the measuring wheel 12. Thus, means for closing the switch 19 may be arranged to be operated by the feed rolls 11 or by other of the moving parts of the rotary cutter assemblage to be hereinafter described. Severing means other than a solenoid operated knife may also be employed.

Referring now to Figure 3, the feed rolls and rotary mechanism specifically illustrated therein will be described. The feed rolls 11, which may be mounted on the same base 25 as the rotary cutting mechanism (mounting members not shown in the drawings), are driven by suitable means as will be hereinafter explained. The feed rolls, which may be rubber covered or of other suitable construction, are preferably adjustable as to pressure exerted on the plastic tube 10. If desired, they may be grooved, Figure 6, to receive the plastic tube and in any case should draw the tube smoothly and continuously from the supply source, should prevent the tube from rotating around its longitudinal axis, and should be so positioned that they will, without substantially deforming or marring its surface, feed the tube 10 at a uniform rate into a fixed guide tube 26 which serves to guide the moving tube 10 into position for cutting. The guide tube 26, which should fit the tube 10 as closely as is feasible without retarding its longitudinal movement, may be secured in fixed position to the common base 25 by an appropriate stanchion 27 and cap-screws 28 and 29, or in other convenient manner. A rotary member 30 coaxial with the guide tube 26 and positioned to rotate around but not to be in contact with it is carried in assembled bearings 31 mounted and retained in stanchions 32, e. g. by a clamping bolt 33 and washers 34, secured to the base 25 by cap-screws 35 or other suitable means. One end of the rotary member is provided with a shoulder 36 and the other end is threaded and fitted with a nut 37 to retain the bearing assembly 31 in which the member turns and also a gear 38 secured to the member 30, e. g. by a key 39. The gear 38 just mentioned meshes with a driving gear 46 keyed to a drive shaft 40 which is driven by any convenient power source. The feed rolls 11 previously mentioned are synchronized with the rotary member 30 in any convenient manner such as by an appropriate variable speed drive 41 and worm gear arrangement 42 transmitting power from the drive shaft 40 to the feed rolls 11.

A shoulder protuberance 36 on the rotary member 30 carries a cutting tool 43 adjustable as to depth and angle of cut and operable while the tool member 30 rotates around the longitudinally moving plastic tube 10. The cutting tool may suitably consist of a short length of round shaft on one end of which is ground a suitably shaped knife edge 44 for making a smooth cut through the wall of the plastic tube. The shoulder protuberance 36 may be drilled radially to receive the slitting knife 43 which may then be adjusted angularly and longitudinally and held in the desired position by means of a set screw 45.

Although the shape of the ground portion of the cutting element may be varied considerably, it has been found that a satisfactory cutter is obtained when the shaft is ground to a V-shaped point, viewed at right angles to the direction of cutting, Figure 4, and when the center of the V-shaped portion is appreciably thicker than the portion immediately adjacent the cutting edge, Figure 5. When ground to this shape, the tool is reversible and each edge may be used in turn before regrinding is necessary. The most advantageous shape of the cutting tool will depend somewhat upon the particular composition of the plastic tube being cut.

In operating the rotary cutter, the desired lead of the knife, i. e. the width of the individual coils of the helicoidal structure to be produced is first decided upon. The number of rotations to be made by the rotary member 30 for each turn of the feed rolls 11 is then calculated by dividing the circumference of one of the rolls 11 by the lead, both values being expressed in the same units. Thus, if the circumference of one of the rolls 11 is 24 inches and a lead of 0.5 inch is desired, the rotary member 30 will be required to rotate 48 times for each rotation of the feed roll 11. The variable speed drive 41 is then adjusted accordingly.

Prior to starting the machine the slitting knife 43 is also adjusted for depth of cut and cutting angle. The knife is usually set so that the cutting edge 44 just projects through one wall of the tube 10. The cutting angle, i. e. the angle between the knife blade 44 and a plane perpendicular to the longitudinal axis of the tube 10, should approximate that which will cause the cutting edge 44 to meet the wall of the advancing tube 10 squarely in the direction of the cut being made. This angle may be determined readily and is the angle whose tangent is equal to the lead divided by the outside circumference of the tube 10, both values being expressed in the same units, i. e.

Tangent of cutting angle =

$$\frac{\text{lead in inches}}{\text{outside circumference of tube in inches}}$$

After the knife has been adjusted to the proper cutting angle and depth, the set screw 45 is tightened, the cutter started, and the tube 10 started through the feed rolls and into the guide tube 26.

The cutting angle, and correspondingly the relative speeds of the tube through the machine and of the rotation of the cutter, may be varied from 0°, at which angle the tube is merely cut off squarely without any forward movement, to 90°, at which angle the tube is cut lengthwise without any rotation of the cutting tool.

It has been found that when the cutting angle is within certain ranges, e. g. within the range of about 10° to about 45° when ethyl cellulose tube is being cut, the pull of the knife as it cuts through the wall of the tube is sufficient to draw the tube through the machine at the desired rate. In such case the feed rolls may, if desired, be removed as much as several feet from the rotary slitting assemblage but are advantageously used to prevent twisting of the tube due to the pressure exerted by the slitting knife. This range will, of course, vary with the composition and dimensions of the tube being cut and with other factors. It should be pointed out, however, that when the feed rolls are located at some distance from the rotary cutter the angle at which the knife is set to produce any desired lead will not necessarily be the same as when the rolls are relatively close to the rotary cutter. In the latter case the knife is usually set at approximately the cutting angle calculated to give the desired lead, whereas in the former case it is usually necessary, in order to obtain the same lead, to set the knife at an angle several degrees greater than the calculated cutting angle.

It should also be pointed out that when the cutting tool is so constructed that the cutting edge lies behind the center line of the shaft, the tool will tend to follow, or to adjust itself automatically, to the correct cutting angle as it rotates around the moving tube. Thus, it is frequently only necessary to adjust the tool for depth of cut, leaving it to turn freely in the rotating member 30 and to control the lead merely by the ratio of the speed of the feed rolls 11 to the rotation of the tool-bearing member 30. When cutting most plastic materials, a leeway of several degrees is allowable in the accuracy of the adjustment of the cutting knife for any given cutting angle, since the nature of the material will usually allow a certain amount of flow around the cutting blade if it is not set accurately at the proper angle without roughening the edges unduly. A cutting angle smaller than the angle calculated to give the desired lead is usually avoided, since when the slitting knife is set at such an angle it may tend to retard the longitudinal movement of the plastic tube and thus cause looseness or buckling of the tube between the feed rolls and the rotary cutter. Usually the slitting knife is set at an angle slightly greater, i. e. 2 to 3 degrees greater, than the calculated cutting angle thus insuring slight tension at all times on the tube approaching the slitting knife. As mentioned previously, this is particularly desirable when the feed rolls are relatively far removed from the rotary cutter.

Although the drawing shows the knife as being rotatable in one direction around the advancing tube, it is obvious that by the installation of suitable reversing gears in the drive line between the rolls 11 and the driving gear 46, the direction of rotation of the cutting tool may be reversed and the machine thus adapted to make either "right-" or "left-hand" helicoidal structures of the type discussed. Further, a plurality of cutting knives may be used and set to make parallel helical cuts in the tubing and the resulting intertwined helicoidal structures later separated. In this manner helicoidal structures may be produced with the individual coils spaced evenly but further apart than is possible when using only one cutting tool. Although a sharpened knife is the preferred cutting means, other equivalent means may be used, if desired. Thus, a rapidly rotating circular cutting blade or saw and appropriate drive mechanism may be advantageously substituted for the knife, particularly when a hard tube is to be cut.

In a specific instance it was desired to produce from an ethyl cellulose composition an helicoidal structure of the type described having an outside diameter of 0.23 inch and a wall thickness of 0.03 inch, the lead or width of each coil being 0.25 inch. Accordingly, a conventional extrusion machine was fitted with a die to produce a tube having the required outside diameter and wall thickness. It was found that the extrusion equipment used functioned best when extruding a tube of this size at the rate of 720 inches per minute. It was calculated that when cutting 720 lineal inches of this tube per minute with a 0.25 inch lead, the rotary cutter should rotate at the rate of 2880 revolutions per minute. Furthermore, since the lead was 0.25 inch and the outside diameter of the tubing was 0.23 inch, which corresponds to a circumference of 0.72 inch, it was calculated that the tangent of the lead angle of the cutting knife should be equal to 0.25 divided by 0.72 or 0.346. Reference to standard tables of trigonometric functions gave the value of the angle whose tangent is 0.346 as 19° 5'. The cutting knife was accordingly set at this angle and at a depth just sufficient to cut through one wall of the tube. The feed rolls serving to feed the extruded tube to the rotary cutter were next adjusted to have a peripheral speed of approximately 720 inches per minute when the rotary cutter was rotating at the rate of 2880 revolutions per minute.

The extruder was then started, the hot extruded tube being conveyed through a spray of cooling water to harden it and thence over the measuring wheel and between the feed rolls and started through the guide tube. The measuring wheel had a circumference of 36 inches, and with each revolution closed contact in an electrical circuit which actuated a solenoid cut-off knife operating upon the helically cut tube. The speed of the machine was adjusted carefully so as to avoid the building up of any tension or slackness in the portion of the plastic tube on the conveyor belt. The entire operation was automatic, it being only necessary to feed the granulated plastic material into the hopper of the extrusion machine and to collect and package the 36-inch lengths of helically cut tube issuing from the machine. This cut tube was found to have an outside diameter of 0.23 inch and the face of each coil was 0.25 inch wide when measured in a direction parallel with the longitudinal axis of the tube. The coil width was very uniform throughout the entire length of the structure and the cut edges were smooth and even.

Other modes of applying the principle of the invention may be employed instead of the one explained, change being made as regards the means and the steps herein disclosed, provided those stated by any of the following claims or their equivalent be employed.

I therefore particularly point out and distinctly claim:

1. The method of cutting a flexible helicoidal structure from a plastic tube, which includes: continuously moving a plastic tube substantially resistant to torsional flexure at a substantially uniform rate along its longitudinal axis past a slitting means adapted to cut through one wall of said tube while said slitting means is rotating around the moving tube in a fixed plane perpendicular to said longitudinal axis.

2. The method of cutting a flexible helicoidal structure from a plastic tube, which includes: continuously moving a plastic tube substantially resistant to torsional flexure at a substantially uniform rate along its longitudinal axis; and, concurrently revolving about said tube at a substantially uniform rate and in a plane perpendicular to said longitudinal axis a slitting means adapted to cut through one wall of said tube.

3. The method of cutting a flexible helicoidal structure from a plastic tube, which includes: revolving at a substantially uniform rate and in a plane perpendicular to the longitudinal axis of said tube a slitting means having the lead of the cutting edge of said slitting means adjusted to draw said tube continuously and at a uniform rate into said means.

4. In a machine for helically slitting a plastic tube, the combination of: rotatable slitting means outside said tube including an adjustable cutter member adapted to slit one wall of the tube at any desired lead; and, feed rolls for continuously moving the tube into and through said rotatable slitting means.

5. In a machine for helically slitting a plastic tube, the combination of: rotatable slitting means outside said tube including an adjustable cutter member adapted to slit one wall of the tube at any desired lead; feed rolls for continuously moving the tube into and through said rotatable slitting means; and, guide means to position said tube for slitting by said cutter.

6. In a machine for helically slitting a plastic tube, the combination of: rotatable slitting means including an adjustable cutter member adapted to slit one wall of the tube at any desired lead; feed rolls for continuously moving the tube into and through said rotatable slitting means; guide means to position said tube for slitting by said cutter; severing means for periodically cutting the formed helicoidal structure into sections; and, means to actuate said severing means when a section of tube of predetermined length has been helically slit by said cutting member.

7. In a machine for helically slitting a plastic tube, the combination of: rotatable slitting means including an adjustable cutter member adapted to slit one wall of the tube at any desired lead; feed rolls for continuously moving the tube into and through said rotatable slitting means; guide means to position said tube for slitting by said cutter; severing means for periodically cutting the formed helicoidal structure into sections; means to actuate said severing means when a section of tube of predetermined length has been helically slit by said cutting member; and, means to drive the rotatable means and feed rolls synchronously.

HAROLD L. BROWN.